US012611741B2

(12) United States Patent
Olsson

(10) Patent No.: US 12,611,741 B2
(45) Date of Patent: Apr. 28, 2026

(54) SYSTEM OF AND METHOD FOR AUTOMATED MOUNTING/DISMOUNTING OF A CUTTING INSERT ON A TOOL BODY

(71) Applicant: SECO TOOLS AB, Fagersta (SE)

(72) Inventor: Mats Olsson, Fagersta (SE)

(73) Assignee: Seco Tools AB, Fagersta (SE)

( * ) Notice: Subject to any disclaimer, the term of this patent is extended or adjusted under 35 U.S.C. 154(b) by 490 days.

(21) Appl. No.: 18/273,920

(22) PCT Filed: Jan. 12, 2022

(86) PCT No.: PCT/EP2022/050475
§ 371 (c)(1),
(2) Date: Jul. 24, 2023

(87) PCT Pub. No.: WO2022/161763
PCT Pub. Date: Aug. 4, 2022

(65) Prior Publication Data
US 2024/0416468 A1     Dec. 19, 2024

(30) Foreign Application Priority Data

Jan. 26, 2021    (EP) .................................... 21153451

(51) Int. Cl.
B23P 19/00         (2006.01)
B23B 27/14         (2006.01)
B23P 15/28         (2006.01)

(52) U.S. Cl.
CPC ............ B23P 15/28 (2013.01); B23B 27/145 (2013.01); B23P 19/006 (2013.01); B23B 2205/21 (2013.01)

(58) Field of Classification Search
CPC .............................. B23P 19/006; B23P 19/06
See application file for complete search history.

(56) References Cited

U.S. PATENT DOCUMENTS 10,035,201 B2 * 7/2018 Hebuterne .............. B23P 19/06

FOREIGN PATENT DOCUMENTS

| CN | 111098125 A | 5/2020 |
| JP | H0580637 U | 11/1993 |
| JP | H10296647 A | 11/1998 |
| SU | 1085749 A1 | 4/1984 |
| WO | 2020178613 A1 | 9/2020 |

* cited by examiner

*Primary Examiner* — Jason L Vaughan
*Assistant Examiner* — Amanda Kreiling
(74) *Attorney, Agent, or Firm* — Corinne R. Gorski

(57) ABSTRACT

A system for automated mounting and dismounting of at least one cutting insert on a tool body with a screwing tool is provided. The cutting insert includes a top surface, a bottom surface, a circumferential side surface connecting the top and bottom surfaces, and a through hole extending from the top surface to the bottom surface for receiving the shaft of a fastening screw. A carrier device is arranged to pick up and release the cutting insert with the fastening screw. The carrier device has a body having a front surface, a rear surface, a circumferential side surface connecting the front and rear surfaces, and a channel extending from a front end opening in the front surface to a rear end opening in the rear surface. A method for automated mounting of a cutting insert with a fastening screw on a tool body is also provided.

22 Claims, 6 Drawing Sheets

SYSTEM OF AND METHOD FOR AUTOMATED MOUNTING/DISMOUNTING OF A CUTTING INSERT ON A TOOL BODY

RELATED APPLICATION DATA

This application is a § 371 National Stage Application of PCT International Application No. PCT/EP2022/050475 filed Jan. 12, 2022 with priority to EP 21153451.6 filed Jan. 26, 2021.

TECHNICAL FIELD

The present disclosure relates to a system for automated mounting and dismounting of at least one cutting insert on a tool body, and a method for automated mounting of at least one cutting insert with a fastening screw on a tool body.

BACKGROUND

Today, cutting tools comprising a tool body with at least one exchangeable cutting insert mounted therein is very popular to use in a cutting process. The tool body can be e.g. a milling cutter or a turning tool holder. The most common way to mount the cutting insert in the tool body is to use a fastening screw.

The cutting insert is usually mounted in a narrow mounting pocket in the tool body in order for the pocket walls to prevent rotation of the cutting insert when mounted on the tool body with only one screw.

Today, the mounting and dismounting of cutting inserts in the tool body are often made by hand. In order to improve the working conditions and productivity, there have been developed some systems for automating the mounting and dismounting process.

U.S. Pat. No. 10,035,201 B2 discloses a replacement device for replacing machining inserts on a tool.

However, a problem with these systems is that they are very bulky and not easy to use in the narrow mounting pocket on the tool body.

SUMMARY OF THE INVENTION

It is an object of the present invention to overcome, or at least partially overcome, said problem by introducing a system for automated mounting and dismounting of at least one cutting insert on a tool body, a method for automated mounting of at least one cutting insert with a fastening screw on a tool body, and a computer program product for performing the method.

The object of the present invention is achieved by means of a system for automated mounting and dismounting of at least one cutting insert on a tool body with a screwing tool, the system comprises

- at least one fastening screw having a shaft and a head, the shaft having an end point opposite to the head;
- at least one cutting insert comprising a top surface, a bottom surface, and a circumferential side surface connecting the top surface and the bottom surface, the cutting insert further comprises a through hole, having a longitudinal axis, extending from the top surface to the bottom surface for receiving the shaft of the fastening screw; and
- a carrier device being able to pick up and release the at least one cutting insert with the therein placed fastening screw, the carrier device comprises a body having a front surface, a rear surface, and a circumferential side surface connecting the front surface and the rear surface, characterized in that the carrier device comprises a channel, having a longitudinal axis, extending from a front end opening in the front surface to a rear end opening in the rear surface, wherein the channel has a length L. The front surface is the surface being in contact with the cutting insert when picked up by the carrier device.

An advantage with this system is that the head of the fastening screw can be accessed by a screwing tool via the channel without removing the carrier device from the cutting insert. Accordingly, the system can be used for mounting and dismounting a cutting insert in a narrow mounting pocket in the tool body where conventional grippers and screwdriver tools cannot be used. Accordingly, the process of mounting and dismounting a cutting insert to a tool body is simplified.

According to an embodiment of the invention, the channel comprises a screw inlet portion extending a distance Ls into the channel from the front end opening, wherein $L_s \geq L/4$, and wherein the cross-section of the screw inlet portion is larger than that of the head of the fastening screw.

An advantage with this embodiment is that the fastening screw is allowed to enter the channel and accordingly, cutting inserts where the head of the fastening screw protrudes outside of the top surface of the cutting insert can be picked up by the carrier device as the head of the fastening screw does not prevent the carrier device from reaching the top surface of the cutting insert.

According to an embodiment of the invention, the channel comprises a shoulder portion located at the distance Ls from the front end opening, wherein the shoulder portion has a cross-section smaller than that of the head of the fastening screw.

An advantage with this embodiment is that the fastening screw is prevented from falling out from the channel during movement of the carrier device with the picked up cutting insert and fastening screw.

According to an embodiment of the invention, the channel comprises a spring located between the front end opening and the rear end opening.

An advantage with this embodiment is that the spring will be compressed when the fastening screw is placed through the channel and the spring will then press against the fastening screw, thus locking the fastening screw in the channel. Accordingly, the fastening screw is prevented from falling out from the channel during movement of the carrier device with the picked up cutting insert and fastening screw.

According to an embodiment of the invention, the channel comprises a tool inlet portion extending a distance Lt into the channel from the rear end opening, wherein $L_t \geq L/4$, and wherein the cross-section of the tool inlet portion is expanding towards the rear end opening. An advantage with this embodiment is that the channel can assist in guiding the screwing tool into alignment with the head of the fastening screw.

According to an embodiment of the invention, the tool inlet portion has a semi-frustoconical shape. Accordingly, a part of the sidewall of the channel is removed.

An advantage with this embodiment is that the carrier device can be positioned closer to the tool body. Accordingly, the carrier device can be used in narrow mounting pockets where conventional grippers and screwdriver tools cannot be used.

According to an embodiment of the invention, the carrier device comprises at least one magnet for picking up the cutting insert. The magnet may be a permanent magnet or an electromagnet. If a permanent magnet is used, the releasing of the cutting insert after fastening it to the tool body with the fastening screw is realized by pulling the carrier device away from the tool body. Alternatively, the carrier device comprises vacuum means for picking up the cutting insert.

An advantage with this embodiment is that the cutting insert can be picked up by its top surface when all other surfaces of the cutting insert are difficult to access.

According to an embodiment of the invention, the front surface comprises a pocket having a bottom surface. The bottom surface having a shape corresponding to the top surface of the cutting insert, wherein the midpoint of the bottom surface is placed so that it coincides with the longitudinal axis of the channel.

An advantage with this embodiment is that the geometry of the front surface of the carrier device is adapted to the actual shape of the cutting insert to be picked up and released. This results in a more stable position for the cutting insert in the carrier device and a decreased risk of losing the cutting insert during mounting and dismounting it on a tool body.

According to an embodiment of the invention, the system further comprises an assembly tray unit for pre-assembly the cutting insert and the fastening screw, wherein the assembly tray unit comprises a through hole, having a longitudinal axis, for receiving the shaft of the fastening screw received in the through hole.

An advantage with this embodiment is that the cutting insert and the fastening screw can be pre-assembled before mounted on the tool body. The cutting insert and the fastening screw can then be picked up simultaneously by the carrier device. Due to the through hole in the assembly tray unit, the fastening screw can be stably provided on the assembly tray unit.

According to an embodiment of the invention, the assembly tray unit further comprises a pocket having a bottom surface, the bottom surface having a shape corresponding to the bottom surface of the cutting insert, wherein the midpoint of the bottom surface is placed so that it coincide with the longitudinal axis of the through hole in the assembly tray unit.

An advantage with this embodiment is that a more stable placement of the cutting insert on the assembly tray unit is achieved.

According to an embodiment of the invention, the assembly tray unit comprises a pocket having a shape corresponding to the front surface of the carrier device.

An advantage with this embodiment is that a more stable placement of the cutting insert on the assembly tray unit can be achieved since the cutting insert can be placed deeper in the assembly tray unit and still be able to be reached by the carrier device.

According to an embodiment of the invention, the system further comprises a gripping tool for gripping a part of the shaft of the fastening screw, which part protrudes from the through hole when received in the assembly tray unit. The gripping tool can be provided at a gripping unit.

An advantage with this embodiment is that the fastening screw can be prevented from being removed before the carrier device is correctly placed on top of the cutting insert.

According to an embodiment of the invention, the carrier device is mounted on a picking device. The picking device can be e.g. a robotic arm.

An advantage with this embodiment is that the movement of the carrier device can be controlled in an automated way.

According to an embodiment of the invention, the system further comprises a tool body, having a longitudinal axis.

The tool body comprises at least one mounting pocket arranged at a distance $d_p$ from the longitudinal axis, for receiving the at least one cutting insert. The at least one mounting pocket comprises a hole for receiving the fastening screw.

An advantage with this embodiment is that the stability of the cutting insert mounted in the tool body can be increased and the risk of rotation of the cutting insert during operation is reduced.

According to an embodiment of the invention, the tool body is mounted on a rotatable support unit.

An advantage with this embodiment is that the position of the mounting pocket can be easily adjusted during mounting and dismounting of the cutting insert.

According to an embodiment of the invention, the system further comprises a screwing tool. The screwing tool can be provided at a screwing unit.

An advantage with this embodiment is that the fastening and loosening of the fastening screw in the tool body can be made automatically and thereby simplifying the process of mounting and dismounting the cutting insert on the tool body.

According to an embodiment of the invention, the body of the carrier device comprises a protruding part protruding from the circumferential side surface, wherein the protruding part comprises a support surface for being in contact with the tool body during mounting or dismounting of the at least one cutting insert.

An advantage with this embodiment is that the carrier device can be in stable contact with the tool body when mounting and dismounting the cutting insert so that the risk of erroneously positioning of the cutting insert on the tool body is decreased.

According to an embodiment of the invention, the support surface is arranged as a downward axial support surface for being in contact with an upward axial support surface on the tool body and providing axial alignment of the cutting insert in the mounting pocket during mounting or dismounting of the at least one cutting insert, wherein the upward axial support surface is provided at an end surface of the tool body and is located at a distance ds from the longitudinal axis of the tool body, wherein $d_s < d_p$.

An advantage with this embodiment is that the cutting insert can be axially aligned in the mounting pocket during mounting and dismounting the cutting insert so that the risk of erroneously positioning of the cutting insert in the mounting pocket is decreased.

According to an embodiment of the invention, the system further comprises a control unit having a processing circuitry for controlling the process of mounting and dismounting the cutting insert to the tool body. The control unit can be e.g. a computer or a smartphone.

The object of the present invention is further achieved by means of a method for automated mounting of at least one cutting insert with a fastening screw on a tool body by a carrier device, wherein the fastening screw having a shaft and a head, wherein the shaft having an end point opposite to the head, and wherein the cutting insert having a top surface, a bottom surface, and a circumferential side surface connecting the top surface and the bottom surface, the cutting insert further comprises a through hole, having a longitudinal axis, extending from the top surface to the bottom surface for receiving the shaft of the fastening screw, and wherein the carrier device comprises a body having a front surface, a rear surface, and a circumferential side surface connecting the front surface and the rear surface, and wherein the carrier device comprises a channel, having a longitudinal axis, extending from a front end opening in the front surface to a rear end opening in the rear surface, wherein the channel has a length L, characterized in that the method comprises the steps of:

inserting the shaft of the fastening screw into the through hole from the top surface of the cutting insert;

placing the front surface of the carrier device on top of the top surface of the cutting insert so that the longitudinal axis of the channel coincides with the longitudinal axis of the through hole;

attaching the carrier device to the cutting insert;

picking up the cutting insert with the therein placed fastening screw using the carrier device;

placing the bottom surface of the cutting insert in a mounting pocket on the tool body by moving the carrier device relative to the tool body;

inserting a screwing tool through the channel via the rear end opening onto the head of the fastening screw by moving the screwing tool relative to the tool body;

fastening the cutting insert on the tool body by rotating the screwing tool.

An advantage with this method is that the head of the fastening screw can be accessed by a screwing tool via the channel without removing the carrier device from the cutting insert. Accordingly, the method can be used for mounting a cutting insert in a narrow mounting pocket in the tool body where conventional grippers and screwdriver tools cannot be used. Accordingly, the process of mounting a cutting insert to a tool body is simplified.

According to an embodiment of the invention, the method comprises the further step of:

before the step of inserting the shaft of the fastening screw into the through hole from the top surface of the cutting insert, placing the cutting insert on an assembly tray unit having a through hole, having a longitudinal axis, for receiving the shaft of the fastening screw.

An advantage with this embodiment is that the cutting insert and the fastening screw can be stably pre-assembled before mounting on the tool body.

According to an embodiment of the invention, the method comprises the further steps of:

between the step of inserting the shaft of the fastening screw into the through hole from the top surface of the cutting insert and the step of placing the front surface of the carrier device on top of the top surface of the cutting insert so that the longitudinal axis of the channel coincides with the longitudinal axis of the through hole, gripping the fastening screw by applying a gripping tool onto the fastening screw; and between the step of attaching the carrier device to the cutting insert and the step of picking up the cutting insert with the therein placed fastening screw using the carrier device, releasing the fastening screw by removing the gripping tool from the fastening screw.

An advantage with this method is that the fastening screw can be prevented from being removed before the carrier device is correctly placed on top of the cutting insert.

According to an embodiment of the invention, the method comprises the further step of:

between the step of picking up the cutting insert with the therein placed fastening screw using the carrier device and the step of placing the bottom surface of the cutting insert in a mounting pocket on the tool body by moving the carrier device relative to the tool body, aligning the end point of the fastening screw with the bottom surface of the cutting insert.

The aligning of the end point of the fastening screw with the bottom surface of the cutting insert can be made by placing the bottom surface of the cutting insert against a surface and thus forcing the fastening screw upwards in the through hole.

An advantage with this embodiment is that the fastening screw does not protrude outside of the bottom surface of the cutting insert when the cutting insert is placed against the tool body and thus, the positioning of the cutting insert on the tool body is simplified.

According to an embodiment of the invention where the tool body comprises at least two mounting pockets, the method comprises the further steps of:

before the step of placing the bottom surface of the cutting insert in a mounting pocket on the tool body by moving the carrier device relative to the tool body, mounting the tool body on a rotatable support unit;

after the step of fastening the cutting insert on the tool body by rotating the screwing tool, withdrawing the screwing tool from the channel;

after the step of withdrawing the screwing tool from the channel, removing the carrier device from the mounted cutting insert;

after the step of removing the carrier device from the mounted cutting insert, rotating the rotatable support unit a distance corresponding to the circumferential distance between two adjacent mounting pockets on the tool body.

An advantage with this embodiment is that a plurality of cutting inserts can be mounted in the tool body.

The object of the present invention is further achieved by means of an alternative method for automated mounting of at least one cutting insert with a fastening screw on a tool body by a carrier device, wherein the fastening screw having a shaft and a head, wherein the shaft having an end point opposite to the head, and wherein the cutting insert having a top surface, a bottom surface, and a circumferential side surface connecting the top surface and the bottom surface, the cutting insert further comprises a through hole, having a longitudinal axis, extending from the top surface to the bottom surface for receiving the shaft of the fastening screw, and wherein the carrier device comprises a body having a front surface, a rear surface, and a circumferential side surface connecting the front surface and the rear surface, and wherein the carrier device comprises a channel, having a longitudinal axis, extending from a front end opening in the front surface to a rear end opening in the rear surface, wherein the channel has a length L, characterized in that the method comprises the steps of:

placing the front surface of the carrier device on top of the top surface of the cutting insert so that the longitudinal axis of the channel coincided with the longitudinal axis of the through hole;

inserting the shaft of the fastening screw into the through hole from the top surface of the cutting insert via the channel in the carrier device;

picking up the cutting insert with the therein placed fastening screw using the carrier device;

placing the bottom surface of the cutting insert in a mounting pocket on the tool body by moving the carrier device relative to the tool body;

inserting a screwing tool through the channel via the rear end opening onto the head of the fastening screw by moving the screwing tool relative to the tool body;

fastening the cutting insert on the tool body by rotating the screwing tool.

An advantage with this method is that the head of the fastening screw can be accessed by a screwing tool via the channel without removing the carrier device from the cutting insert. Accordingly, the method can be used for mounting a cutting insert in a narrow mounting pocket in the tool body where conventional grippers and screwdriver tools cannot be used. Accordingly, the process of mounting a cutting insert to a tool body is simplified.

According to an embodiment of the invention, the alternative method comprises the further step of:

between the step of picking up the cutting insert with the therein placed fastening screw using the carrier device and the step of placing the bottom surface of the cutting insert in a mounting pocket on the tool body by moving the carrier device relative to the tool body, aligning the end point of the fastening screw with the bottom surface of the cutting insert.

The aligning of the end point of the fastening screw with the bottom surface of the cutting insert can be made by placing the bottom surface of the cutting insert against a surface and thus forcing the fastening screw upwards in the through hole.

An advantage with this embodiment is that the fastening screw does not protrude outside of the bottom surface of the cutting insert when the cutting insert is placed against the tool body and thus simplifies the positioning of the cutting insert on the tool body.

According to an embodiment of the invention where the tool body comprises at least two mounting pockets, the alternative method comprises the further steps of:

before the step of placing the bottom surface of the cutting insert in a mounting pocket on the tool body by moving the carrier device relative to the tool body, mounting the tool body on a rotatable support unit;

after the step of fastening the cutting insert on the tool body by rotating the screwing tool, withdrawing the screwing tool from the channel;

after the step of withdrawing the screwing tool from the channel, removing the carrier device from the mounted cutting insert;

after the step of removing the carrier device from the mounted cutting insert, rotating the rotatable support unit a distance corresponding to the circumferential distance between two adjacent mounting pockets on the tool body.

An advantage with this embodiment is that a plurality of cutting inserts can be mounted in the tool body.

8

Figure 7:
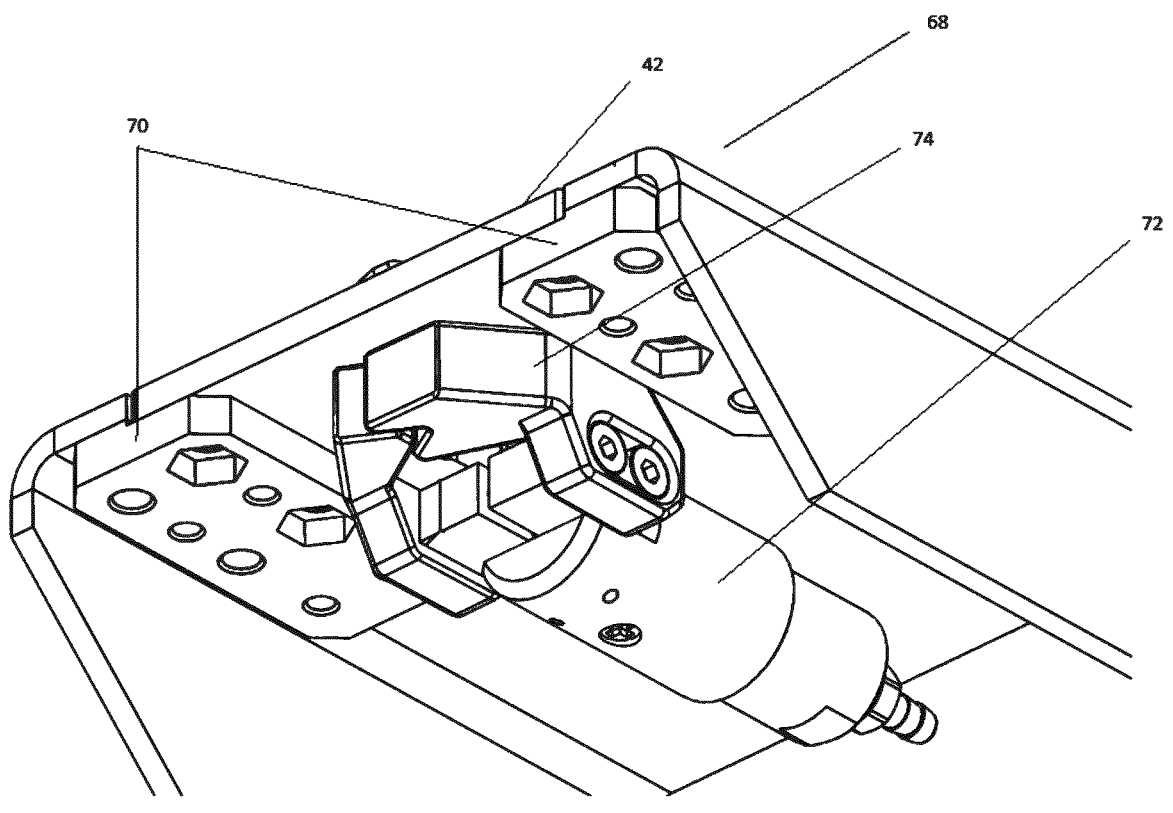

FIG. 7 schematically illustrates a bottom view of a pre-assembly station according to an embodiment of the invention.

Figure 8:
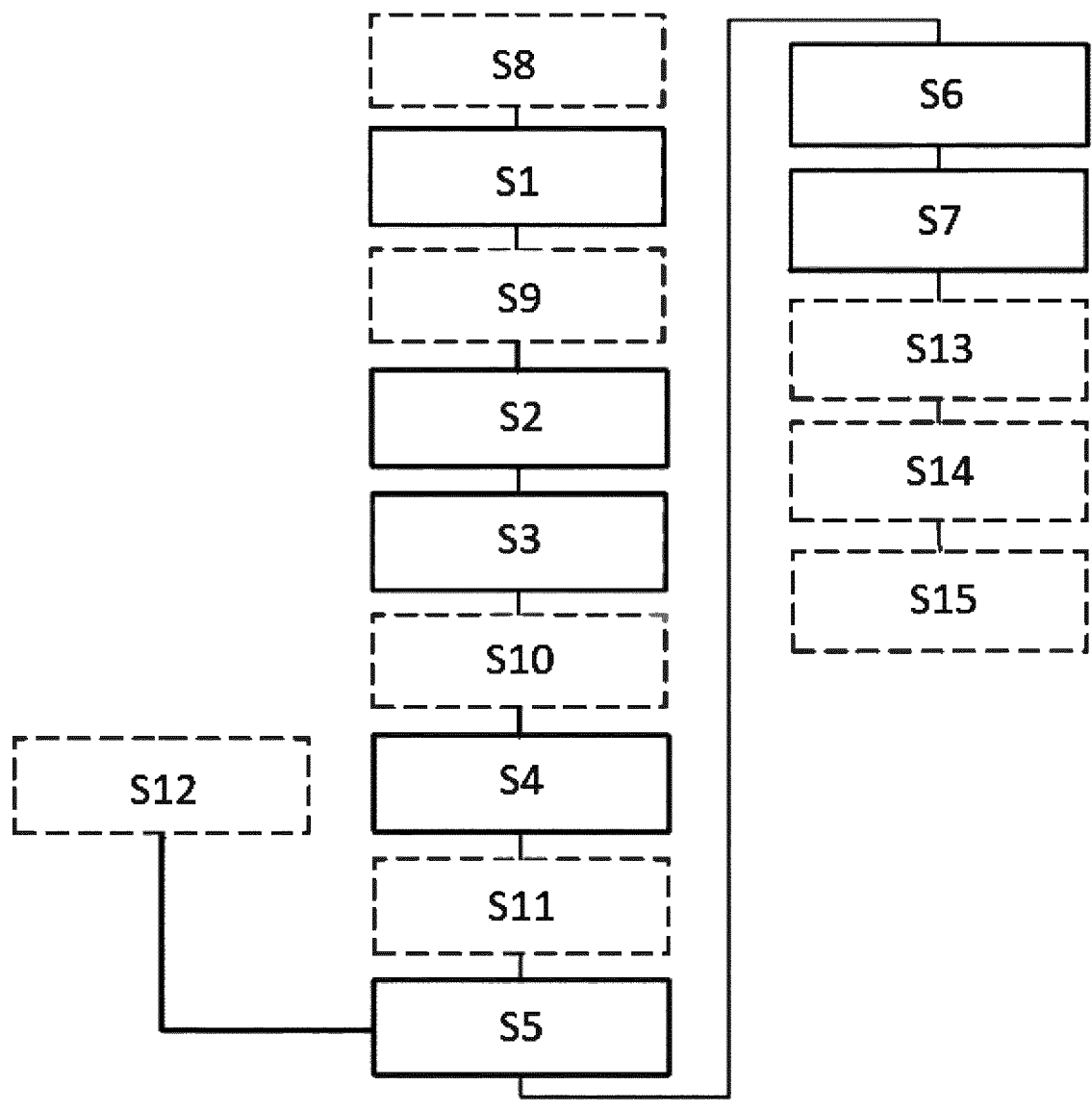

FIG. 8 schematically illustrates a flow chart of example method steps according to an embodiment of the invention.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that the disclosure will be thorough and complete, and will fully convey the scope of the invention to those skilled in the art. Like reference numbers refer to like elements throughout. The elements illustrated in the drawings are not necessary according to scale. Some elements might have been enlarged in order to clearly illustrate those elements.

Figure 1:
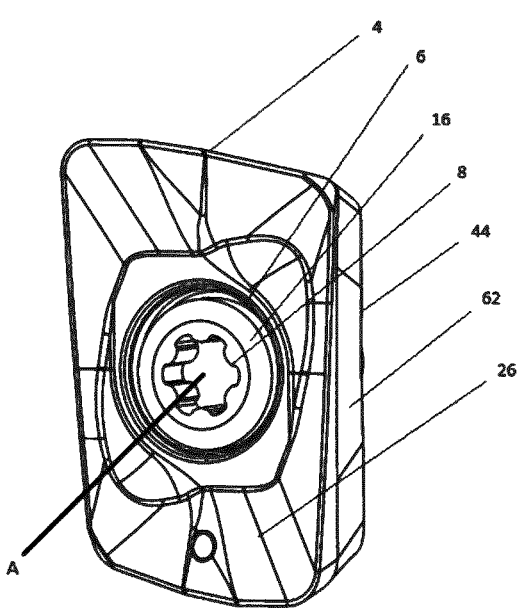
FIG. 1 schematically illustrates a cutting insert having a through hole with a fastening screw placed therein.

FIG. 1 schematically illustrates a cutting insert (4) having a top surface (26), a bottom surface (44), and a circumferential side surface (62) connecting the top surface (26) and the bottom surface (44). The cutting insert (4) further comprises a through hole (6), having a longitudinal axis (A), extending from the top surface (26) to the bottom surface (44). A fastening screw (8) is placed within the through hole (6). The fastening screw (8) having a head (16).

Figure 2:
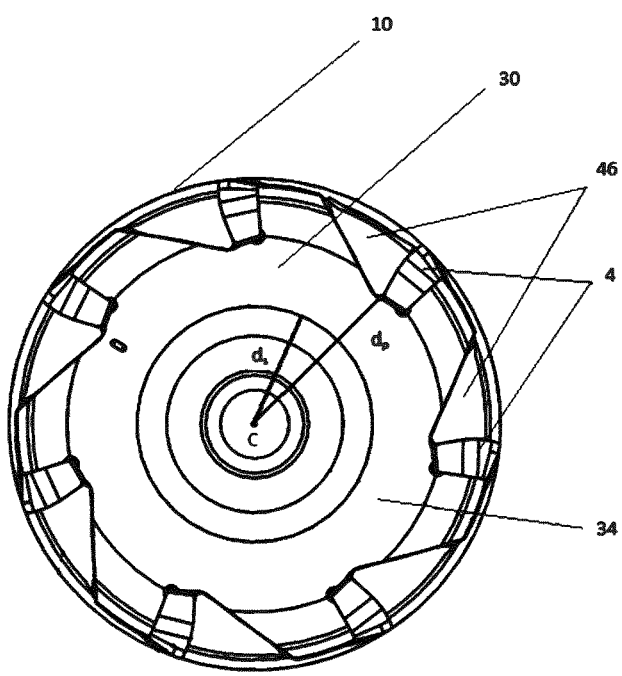
FIG. 2 schematically illustrates a bottom view of a tool body with mounting pockets having cutting inserts mounted therein.

FIG. 2 schematically illustrates a bottom view of a tool body (10) with an end surface (34) having a longitudinal axis (C). The tool body (10) comprises a plurality of circumferentially distributed mounting pockets (46), arranged at a distance $d_p$ from the longitudinal axis (C), with cutting inserts (4) mounted therein. The tool body (10) further comprises an upward axial support surface (30) at the end surface (34) located a distance $d_s$ from the longitudinal axis (C). In FIG. 2, the tool body is illustrated in the form of a milling cutter.

Figure 3:
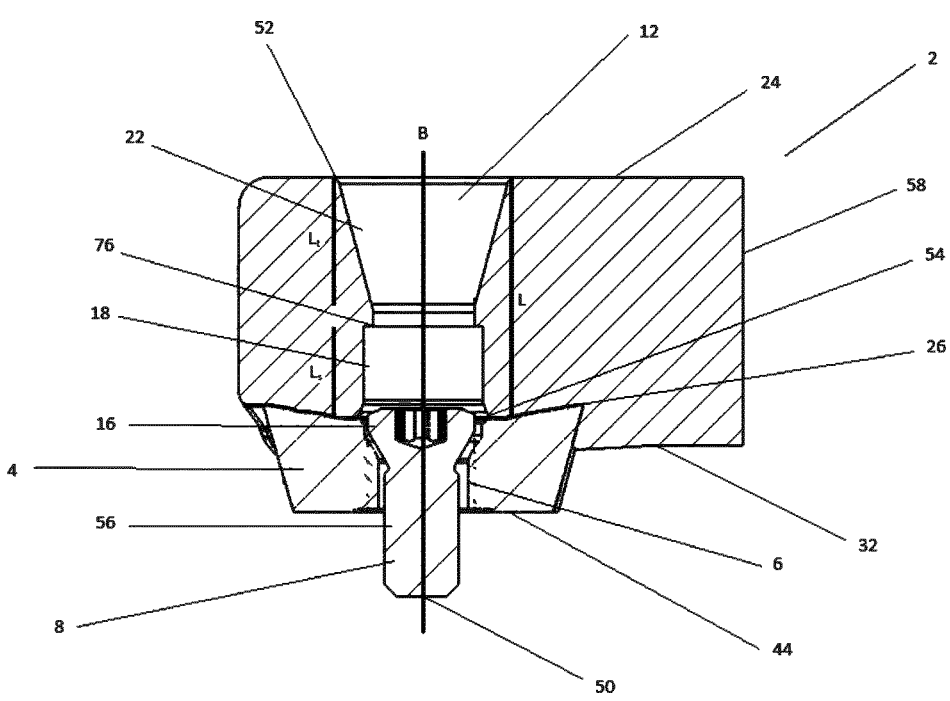
FIG. 3 schematically illustrates a cross-sectional view of a carrier device according to an embodiment of the invention.

FIG. 3 schematically illustrates a cross-sectional view of a carrier device (2). The carrier device (2) is arranged to pick up and release a cutting insert (4) having a through hole (6) with a fastening screw (8) received therein, as illustrated in FIG. 1, by the top surface (26) of the cutting insert (4). The fastening screw having a shaft (56) and a head (16). The shaft (56) further having an end point (50) opposite to the head (16). The carrier device (2) comprises a body having a front surface (32), a rear surface (24), and a circumferential side surface (58) connecting the front surface (32) and the rear surface (24). The carrier device (2) further comprises a channel (12), having a longitudinal axis (B), extending from a front end opening (54) in the front surface (32) to a rear end opening (52) in the rear surface (24). The channel (12) has a length L. The front surface (32) being the surface being in contact with the cutting insert (4) when picked up by the carrier device (2).

FIG. 3 further illustrates that the channel (12) comprises a screw inlet portion (18) extending a distance $L_s$ into the channel (12) from the front end opening (54). The screw inlet portion (18) having a cross-section larger than that of the head (16) of the fastening screw (8), thereby allowing the fastening screw (8) to enter the channel (12).

FIG. 3 further illustrates that the channel (12) comprises a shoulder portion (76) located at the distance $L_s$ from the front end opening (54). The shoulder portion (76) having a cross-section smaller than that of the head (16) of the fastening screw (8), thereby preventing the fastening screw (8) from falling out of the channel (12) during movement of the carrier device (2).

FIG. 3 further illustrates that the channel (12) comprises a tool inlet portion (22) extending a distance $L_t$ into the channel (12) from the rear end opening (52). The tool body portion (22) having a cross-section expanding towards the rear end opening (52).

FIG. 3 further illustrates that the end point (50) of the fastening screw (8) protrudes from the bottom surface (44) of the cutting insert (4).

Figure 4:
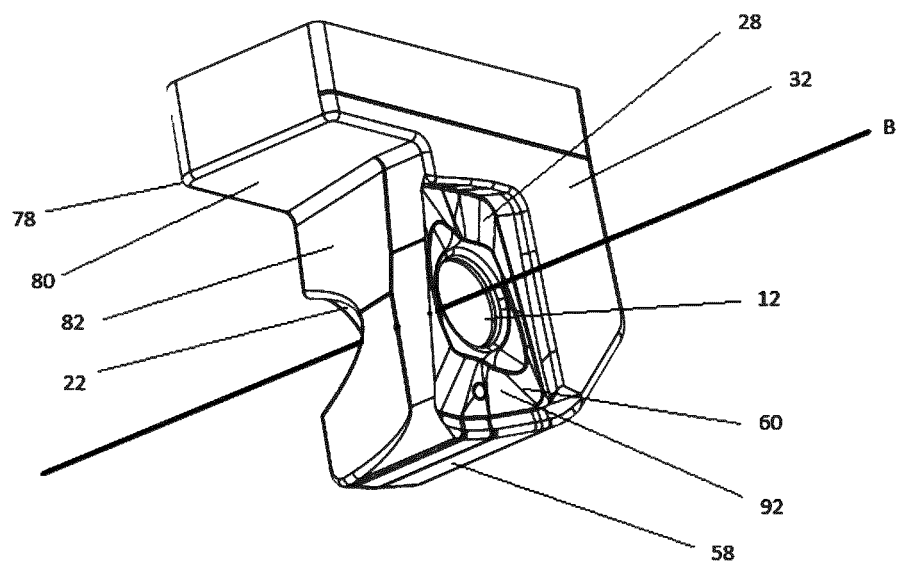
FIG. 4 schematically illustrates a carrier device according to an embodiment of the invention.

FIG. 4 schematically illustrates a carrier device where the front side (32) comprises a pocket (60) having a bottom surface (92). The bottom surface (92) having a shape corresponding to the top surface (26) of the cutting insert (4) to be picked up and released. The midpoint of the bottom surface (92) is placed so that it coincides with the longitudinal axis (B) of the channel (12). The carrier device is further equipped with a magnet (28). FIG. 4 further illustrates that the tool inlet portion (22) has a semi-frustoconical shape.

FIG. 4 also illustrates that the body of the carrier device (2) comprises a protruding part (78) protruding from the circumferential side surface (58). The protruding part (78) comprises a support surface (80) for being in contact with the tool body (10) during mounting or dismounting of the at least one cutting insert (4). The support surface (80) being arranged as an axial support surface. FIG. 4 further illustrates that the body of the carrier device (2) comprises a support surface (82) for being in contact with the tool body (10) during mounting and dismounting of the at least one cutting insert (4). The support surface (82) being arranged as a radial support surface. The support surface (82) being a part of the circumferential side surface (58).

Figure 5:
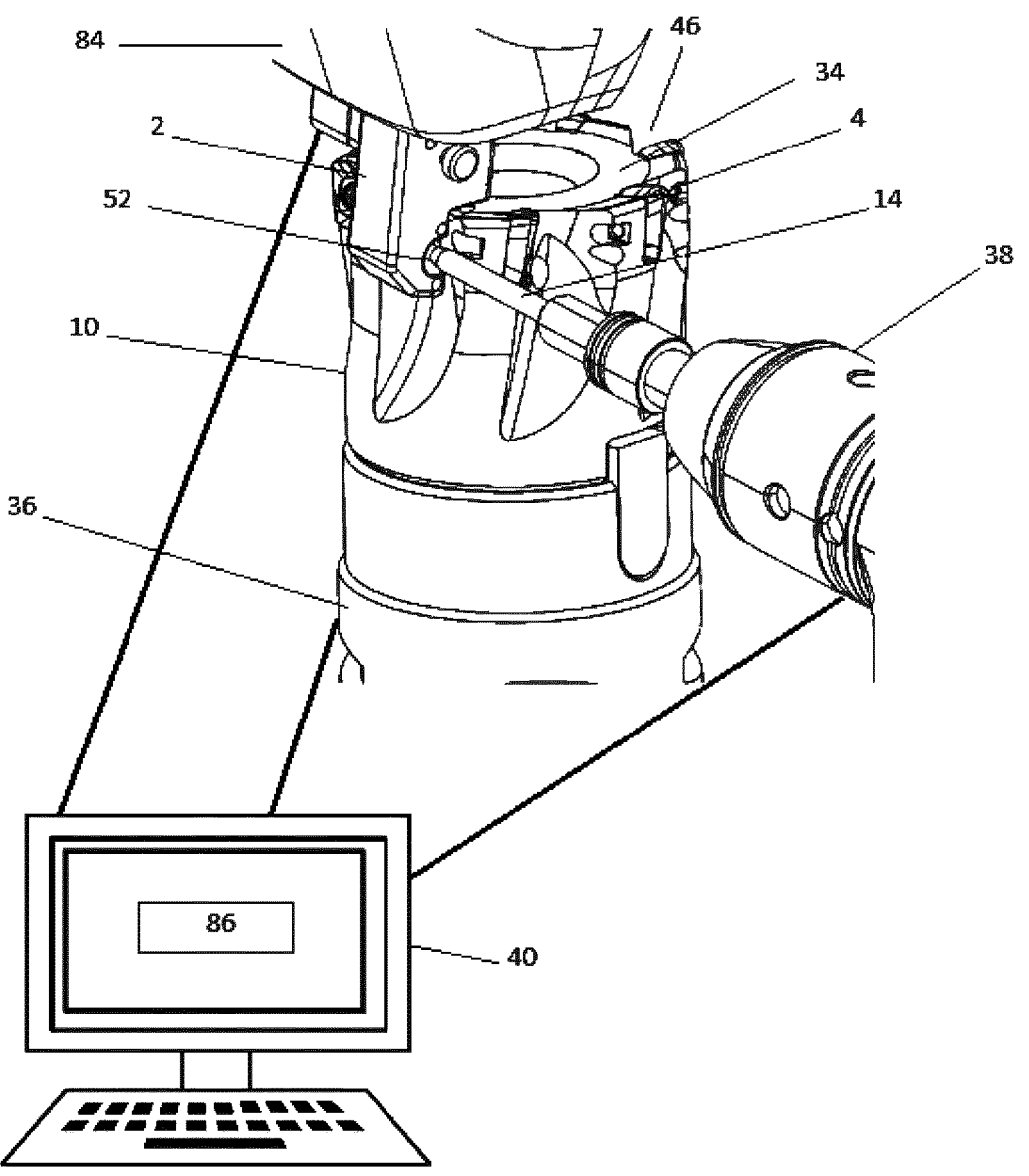
FIG. 5 schematically illustrates a system according to an embodiment of the invention.

FIG. 5 schematically illustrates a system for automated mounting and dismounting of at least one cutting insert (4) on a tool body (10). The illustrated system comprises a tool body (10) with a plurality of cutting inserts (4) mounted in a plurality of circumferentially distributed mounting pockets (46) by use of fastening screws (8). The tool body (10) is mounted, with the end surface (34) upwards, on a rotatable support device (36). The rotatable support device (36) being able to change the position of the mounting pockets (46) in the tool body (10) by rotating the tool body (10). A carrier device (2), as described above, is placing a cutting insert (4), with a fastening screw (8) placed in the through hole (6) in a mounting pocket (46) in the tool body (10) and a screwing tool (14), mounted on a screwing unit (38), is inserted into the channel (12) via the rear end opening (52). The carrier device (2) being mounted on a picking device (84). In FIG. 5, the picking device (84) being illustrated as a robotic arm. The screwing tool (14) is placed onto the head (16) of the fastening screw (8) and the cutting insert (4) is fastened to the tool body (10) by rotating the screwing tool (14), thereby fastening the fastening screw (8). The system further comprises a control unit (40) having a processing circuitry (86) for controlling the process of mounting and dismounting the cutting insert (4) to the tool body (10). In FIG. 5, the control unit (40) is illustrated as a computer.

Figure 6A:
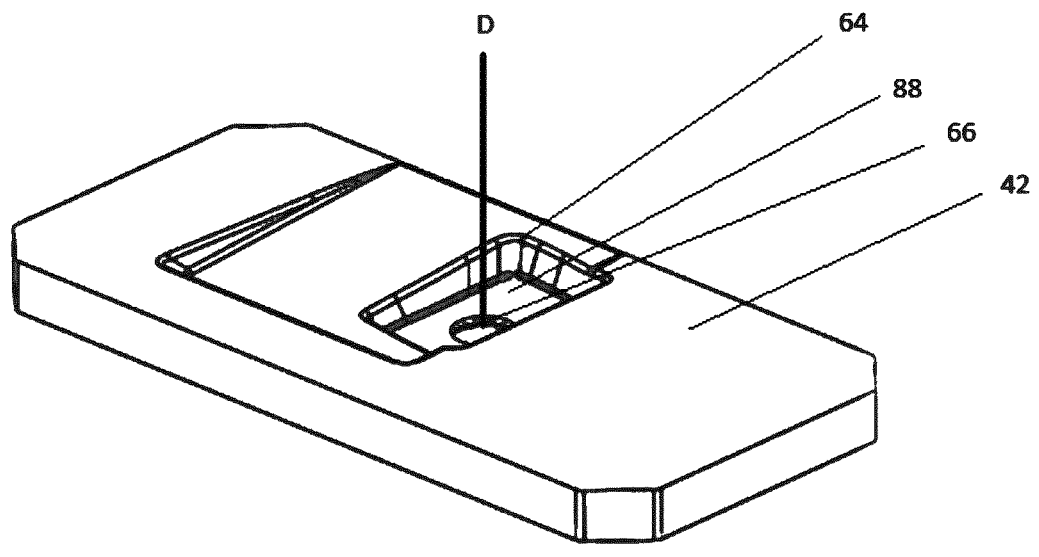
FIG. 6A schematically illustrates an assembly tray unit according to an embodiment of the invention.

FIG. 6A schematically illustrates an assembly tray unit (42) for pre-assembly of the cutting insert (4) and the fastening screw (8). The assembly tray unit (42) comprises a through hole (66), having a longitudinal axis (D), for receiving the shaft (56) of the fastening screw (8). The assembly tray unit (42) further comprises a pocket (64) having a bottom surface (88). The bottom surface (88) having a shape corresponding to the bottom surface (44) of the cutting insert (4). The midpoint of the bottom surface (88) is placed so that it coincides with the longitudinal axis (D) of the through hole (66).

Figure 6B:
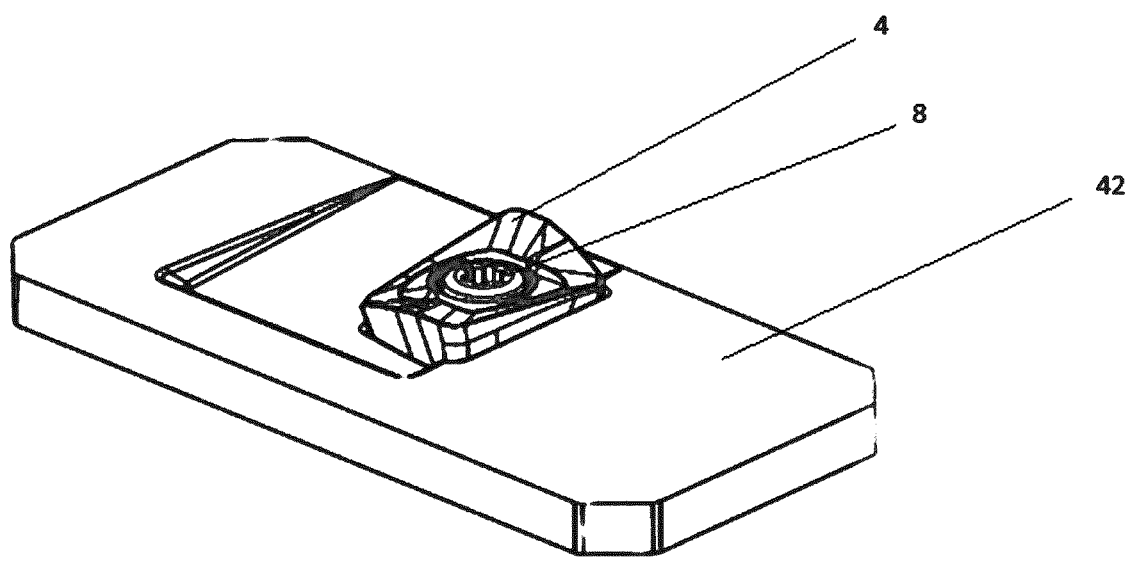
FIG. 6B schematically illustrates an assembly tray unit according to an embodiment of the invention with a cutting insert and a fastening screw placed thereon.

FIG. 6B schematically illustrates an assembly tray unit (42) with a cutting insert (4) and a fastening screw (8) placed thereon.

FIG. 7 schematically illustrates a bottom view of a pre-assembly station (68). The pre-assembly station (68) comprises an assembly tray unit (42), as described above, which is mounted on two support elements (70). The pre-assembly station (68) further comprises a gripping tool (74) provided at a gripping unit (72). The gripping tool (74) being arranged to grip a part of the shaft (56) of the fastening screw (8), which part protrudes from the through hole (66) when received in the assembly tray unit (42). In FIG. 7, the gripping tool (74) is illustrated as a pair of gripping claws.

FIG. 8 illustrates a flow chart of example method steps according to an embodiment of the invention.

The method for automated mounting of at least one cutting insert (4) with a fastening screw (8) on a tool body (10) by a carrier device (2), wherein the fastening screw (8) having a shaft (56) and a head (16), wherein the shaft (56) having an end point (50) opposite to the head (16), and wherein the cutting insert (4) having a top surface (26), a bottom surface (44), and a circumferential side surface (62) connecting the top surface (26) and the bottom surface (44), the cutting insert (4) further comprises a through hole (6), having a longitudinal axis (A), extending from the top surface (26) to the bottom surface (44) for receiving the shaft (56) of the fastening screw (8), and wherein the carrier device (2) comprises a body having a front surface (32), a rear surface (24), and a circumferential side surface (58) connecting the front surface (32) and the rear surface (24), and wherein the carrier device (2) comprises a channel (12), having a longitudinal axis (B), extending from a front end opening (54) in the front surface (32) to a rear end opening (52) in the rear surface (24), wherein the channel (12) has a length L comprises the steps of:

inserting (S1) the shaft (56) of the fastening screw (8) into the through hole (6) from the top surface (26) of the cutting insert (4);

placing (S2) the front surface (32) of the carrier device (2) on top of the top surface (26) of the cutting insert (4) so that the longitudinal axis (B) of the channel coincides with the longitudinal axis (A) of the through hole (6);

attaching (S3) the carrier device (2) to the cutting insert (4);

picking up (S4) the cutting insert (4) with the therein placed fastening screw (8) using the carrier device (2);

placing (S5) the bottom surface (44) of the cutting insert (4) in a mounting pocket (46) on the tool body (10) by moving the carrier device relative to the tool body (10);

inserting (S6) a screwing tool (14) through the channel (12) via the rear end opening (52) onto the head (16) of the fastening screw (8) by moving the screwing tool (14) relative to the tool body (10);

fastening (S7) the cutting insert (4) on the tool body (10) by rotating the screwing tool (14).

Optionally, the method comprises the further step of:

before step (S1), placing (S8) the cutting insert (4) on an assembly tray unit (42) having a through hole (66), having a longitudinal axis (D), for receiving the shaft (56) of the fastening screw (8).

Optionally, the method comprises the further steps of:

between step (S1) and (S2), gripping (S9) the fastening screw (8) by applying a gripping tool (74) onto the fastening screw (8); and between step (S3) and (S4), releasing (S10) the fastening screw (8) by removing the gripping tool (74) from the fastening screw (8).

Optionally, the method comprises the further step of:

between step (S4) and (S5), aligning (S11) the end point (50) of the fastening screw (8) with the bottom surface (44) of the cutting insert (4).

Optionally, where the tool body (10) comprises at least two mounting pockets (46), the method comprises the further steps of:

before step (S5), mounting (S12) the tool body (10) on a rotatable support unit (36);

after step (S7), withdrawing (S13) the screwing tool (14) from the channel (12);

after step (S13), removing (S14) the carrier device (2) from the mounted cutting insert (4);

after step (S14), rotating (S15) the rotatable support unit (36) a distance corresponding to the circumferential distance between two adjacent mounting pockets (46) on the tool body (10).

The invention claimed is:

1. A system for automated mounting and dismounting of at least one cutting insert on a tool body with a screwing tool, the system comprising:

at least one fastening screw having a shaft and a head, the shaft having an end point opposite to the head;

at least one cutting insert including a top surface, a bottom surface, and a circumferential side surface connecting the top surface and the bottom surface, the at least one cutting insert further including a through hole having a longitudinal axis extending from the top surface to the bottom surface for receiving the shaft of the fastening screw; and a carrier device arranged to pick up and release the at least one cutting insert and therein placed fastening screw, the carrier device including a body having a front surface, a rear surface, and a circumferential side surface connecting the front surface and the rear surface, the carrier device including a channel having a longitudinal axis extending from a front end opening in the front surface to a rear end opening in the rear surface, wherein the channel has a length L.

2. The system for automated mounting and dismounting of the at least one cutting insert according to claim 1, wherein the channel includes a screw inlet portion extending a distance $L_s$ into the channel from the front end opening, wherein $L_s \geq L/4$, and wherein a cross-section of the screw inlet portion is larger than a cross-section of the head of the fastening screw.

3. The system for automated mounting and dismounting of the at least one cutting insert according to claim 2, wherein the channel includes a shoulder portion located at the distance $L_s$ from the front end opening, wherein the shoulder portion has a cross-section smaller than the cross-section of the head of the fastening screw.

4. The system for automated mounting and dismounting of the at least one cutting insert according to claim 1, wherein the channel includes a spring located between the front end opening and the rear end opening.

5. The system for automated mounting and dismounting of the at least one cutting insert according to claim 1, wherein the channel includes a tool inlet portion extending a distance $L_t$ into the channel from the rear end opening, wherein $L_t \geq L/4$, and wherein a cross-section of the tool inlet portion is expanding towards the rear end opening.

6. The system for automated mounting and dismounting of the at least one cutting insert according to claim 5, wherein the tool inlet portion has a semi-frustoconical shape.

7. The system for automated mounting and dismounting of the at least one cutting insert according to claim 1, wherein the carrier device includes at least one magnet arranged for picking up the at least one cutting insert.

8. The system for automated mounting and dismounting of the at least one cutting insert according to claim 1, wherein the front surface includes a pocket having a bottom surface, the bottom surface having a shape corresponding to the top surface of the cutting insert, wherein a midpoint of the bottom surface is placed so that it coincides with the longitudinal axis of the channel.

9. The system for automated mounting and dismounting of the at least one cutting insert according to claim 1, further comprising an assembly tray unit for pre-assembly of the at least one cutting insert and the fastening screw, wherein the assembly tray unit includes a through hole, having a longitudinal axis, for receiving the shaft of the fastening screw received in the through hole.

10. The system for automated mounting and dismounting of the at least one cutting insert according to claim 9, wherein the assembly tray unit includes a pocket having a bottom surface, the bottom surface of the pocket having a shape corresponding to the bottom surface of the at least one cutting insert, wherein a midpoint of the bottom surface is placed so that it coincides with the longitudinal axis of the through hole.

11. The system for automated mounting and dismounting of the at least one cutting insert according to claim 9 further comprising a gripping tool arranged for gripping a part of the shaft of the fastening screw, which part protrudes from the through hole when received in the assembly tray unit.

12. The system for automated mounting and dismounting of the at least one cutting insert according to claim 1, wherein the carrier device is mounted on a picking device.

13. The system for automated mounting and dismounting of the at least one cutting insert according to claim 1, further comprising a tool body, having a longitudinal axis, the tool body including at least one mounting pocket arranged at a distance $d_p$ from the longitudinal axis, for receiving the at least one cutting insert, wherein the at least one mounting pocket has a hole arranged for receiving the fastening screw.

14. The system for automated mounting and dismounting of the at least one cutting insert according to claim 13, wherein the tool body is mounted on a rotatable support unit.

15. The system for automated mounting and dismounting of the at least one cutting insert according to claim 1, further comprising a screwing tool.

16. The system for automated mounting and dismounting of the at least one cutting insert according to claim 13, wherein the body of the carrier device includes a protruding part protruding from the circumferential side surface, wherein the protruding part has a support surface arranged for being in contact with the tool body during mounting or dismounting of the at least one cutting insert.

17. The system for automated mounting and dismounting of the at least one cutting insert according to claim 16, wherein the support surface is arranged as a downward axial support surface for being in contact with an upward axial support surface on the tool body and providing axial alignment of the cutting insert in the mounting pocket during mounting or dismounting of the at least one cutting insert, wherein the upward axial support surface is provided at an end surface of the tool body and is located at a distance $d_s$ from the longitudinal axis, wherein $d_s < d_p$.

18. A method for automated mounting of at least one cutting insert with a fastening screw on a tool body by a carrier device, wherein the fastening screw includes a shaft and a head, the shaft having an end point opposite to the head, and wherein the at least one cutting insert having a top surface, a bottom surface, and a circumferential side surface connecting the top surface and the bottom surface, the at least one cutting insert further including a through hole, having a longitudinal axis, extending from the top surface to the bottom surface for receiving the shaft of the fastening screw, and wherein the carrier device includes a body having a front surface, a rear surface, and a circumferential side surface connecting the front surface and the rear surface, and wherein the carrier device has a channel, having a longitudinal axis, extending from a front end opening in the front surface to a rear end opening in the rear surface, wherein the channel has a length L, the method comprising the steps of:

inserting (S1) the shaft of the fastening screw into the through hole from the top surface of the at least one cutting insert;

placing (S2) the front surface of the carrier device on top of the top surface of the at least one cutting insert so that the longitudinal axis of the channel coincides with the longitudinal axis of the through hole;

attaching (S3) the carrier device to the at least one cutting insert;

picking up (S4) the at least one cutting insert with the therein placed fastening screw using the carrier device;

placing (S5) the bottom surface of the at least one cutting insert in a mounting pocket on the tool body by moving the carrier device relative to the tool body;

inserting (S6) a screwing tool through the channel via the rear end opening onto the head of the fastening screw by moving the screwing tool relative to the tool body; and fastening (S7) the at least one cutting insert on the tool body by rotating the screwing tool.

19. The method for automated mounting of the at least one cutting insert according to claim 18, wherein the method comprises the further step of:

before step (S1), placing (S8) the at least one cutting insert on an assembly tray unit having a through hole, having a longitudinal axis, arranged for receiving the shaft of the fastening screw.

20. The method for automated mounting of at the least one cutting insert according to claim 18, wherein the method comprises the further steps of:

between step (S1) and (S2), gripping (S9) the fastening screw by applying a gripping tool onto the fastening screw; and between step (S3) and (S4), releasing (S10) the fastening screw by removing the gripping tool from the fastening screw.

21. The method for automated mounting of the at least one cutting insert according to claim 18, wherein the method comprises the further step of:

between step (S4) and (S5), aligning (S11) the end point of the fastening screw with the bottom surface of the at least one cutting insert.

22. The method for automated mounting of the at least one cutting insert according to claim 18, wherein the tool body includes at least two mounting pockets, wherein the method comprises the further steps of:

before step (S5), mounting (S12) the tool body on a rotatable support unit;

after step (S7), withdrawing (S13) the screwing tool from the channel;

after step (S13), removing (S14) the carrier device from the mounted cutting insert; and after step (S14), rotating (S15) the rotatable support unit a distance corresponding to a circumferential distance between two adjacent mounting pockets on the tool body.

* * * * *